(12) United States Patent
Tanaka

(10) Patent No.: US 8,928,961 B2
(45) Date of Patent: Jan. 6, 2015

(54) IMAGE READING DEVICE, IMAGE FORMING APPARATUS THEREWITH, AND METHOD OF CONTROLLING AN IMAGE READING DEVICE

(71) Applicant: KYOCERA Document Solutions Inc., Osaka (JP)

(72) Inventor: Kei Tanaka, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 13/951,632

(22) Filed: Jul. 26, 2013

(65) Prior Publication Data

US 2014/0029074 A1 Jan. 30, 2014

(30) Foreign Application Priority Data

Jul. 27, 2012 (JP) ................................. 2012-166749

(51) Int. Cl.

| G03F 3/08 | (2006.01) |
|---|---|
| H04N 1/04 | (2006.01) |
| H04N 1/40 | (2006.01) |
| H04N 1/46 | (2006.01) |
| H04N 1/024 | (2006.01) |
| H04N 1/60 | (2006.01) |
| H04N 1/48 | (2006.01) |

(52) U.S. Cl.
CPC ............ H04N 1/6086 (2013.01); H04N 1/484 (2013.01)
USPC ........... 358/518; 358/505; 358/509; 358/510; 358/514; 358/523; 358/482; 358/483; 358/494; 358/496; 358/497

(58) Field of Classification Search
None
See application file for complete search history.

(56) References Cited

U.S. PATENT DOCUMENTS 5,313,313 A 5/1994 Sato
5,914,486 A * 6/1999 Yamamoto .................... 250/226
(Continued)

FOREIGN PATENT DOCUMENTS

| JP | H 10-070634 A | 3/1998 |
| JP | H 11-234528 A | 8/1999 |
| JP | 2000-349969 A | 12/2000 |
| JP | 2001-203900 A | 7/2001 |

OTHER PUBLICATIONS

English Abstract and Translation for JP 2000-349969 A, published Dec. 15, 2000.

(Continued)

Primary Examiner — Marivelisse Santiago Cordero
Assistant Examiner — Moustapha Diaby
(74) Attorney, Agent, or Firm — NDQ&M Watchstone LLP

(57) ABSTRACT

An image reading device has a light source section that includes light sources of a plurality of colors and that emits light in one color during a period for reading one line and switches the color of the light source lit cyclically from one line to the next, an image sensor that reads one color per line, a data generation section that generates image data of the light source color which is the color of the light source lit during reading, a memory that stores a plurality of lines' worth of the image data, and a remaining color component generation section that determines the pixel value of a color component other than the light source color based on the pixel values of pixels around a pixel of interest.

13 Claims, 8 Drawing Sheets

(56) References Cited

U.S. PATENT DOCUMENTS

| | | | |
|---|---|---|---|
| 6,222,649 B1 | 4/2001 | Lavelle et al. | |
| 8,049,908 B2 * | 11/2011 | Shoda | 358/1.13 |
| 2008/0187214 A1 * | 8/2008 | Shoda | 382/162 |
| 2008/0315071 A1 * | 12/2008 | Kubo et al. | 250/208.1 |
| 2013/0120812 A1 * | 5/2013 | Kim et al. | 358/525 |

OTHER PUBLICATIONS

English language abstract and machine translation for JP H 11-234528 A published Aug. 27, 1999.

English language abstract and machine translation for JP 2001-203900 A published Jul. 27, 2001.

* cited by examiner

IMAGE READING DEVICE, IMAGE FORMING APPARATUS THEREWITH, AND METHOD OF CONTROLLING AN IMAGE READING DEVICE

INCORPORATION BY REFERENCE

This application is based upon and claims the benefit of priority from the corresponding Japanese Patent Application No. 2012-166749 filed on Jul. 27, 2012, the entire contents of which are incorporated herein by reference.

BACKGROUND

The present disclosure relates to an image reading device that reads a document by shining light of a plurality of colors on the document, an image forming apparatus provided with such an image reading device, and a method of controlling an image reading device.

An image forming apparatus such as a multifunctional product/printer/peripheral or a copier includes an image reading device for copying, scanning, and other purposes. An image reading device includes, among others, a light source from which light is shone on a document, and an image sensor to which the light reflected from the document is shone back for conversion into an electrical signal. Some image reading devices read in colors. Some of them achieve color reading by turning on light sources of a plurality of colors (for example, three colors, like R (red), G (green), and B (blue)) cyclically, reading the different colors with an image sensor, and blending image data of the different colors into color image data.

One known image reading device is configured, specifically, as follows. By a lighting means, light sources of a plurality of colors (R (red), G (green), and B (blue)) are lit cyclically within each line to irradiate a document on a document stand, and by a focusing means, the resulting reflected or transmitted light is focused on a linear image sensor, so that a color image on the document is read. The image reading device further includes a transparent flat glass plate that is rotatable about the optical axis of the focusing means, a driving means for making the transparent flat glass plate rotate, and a controlling means for controlling the lighting means and the flat glass plate driving means. This configuration is aimed at eliminating a color displacement, which can be as large as ⅔ lines at the maximum, that occurs when data of three colors, R (red), G (green), and B (blue), are blended.

Conventionally, in an image reading device including light sources of a plurality of colors, within the width of one line determined from the reading resolution, the light source that is lit to emit light is switched. During the period for one line, reading for the plurality of colors is performed by an image sensor. Subsequently, based on the output of the image sensor, a plurality of colors' worth image data per line is generated. For example, in a case where three colors like R (red), G (green), and B (blue) are involved, during the period for reading one line, a red lamp, a green lamp, and a blue lamp are lit. As these lamps of different colors are lit, R (red), G (green), and B (blue) line data is generated as image data.

Here, reading and transferring the electric charges stored in the individual light receiving elements (photoelectric conversion elements) included in the image sensor requires a certain amount of time. Accordingly, compared with reading in black and white with the light sources of all the colors lit simultaneously, reading in three colors of R (red), G (green), and B (blue) requires three times the time (at one-third of the linear scanning speed). In other words, in reading in colors of R (red), G (green), and B (blue), reading is done three times per line, and thus reading one line takes, in color reading, three times the time required in black-and-white (single-color) reading. Thus, a color image cannot be read fast, and the reading speed in black and white is inferior to that in colors. In this way, color reading is disadvantageous in terms of productivity.

In the well-known image reading device mentioned above, an attempt is made to eliminate a color displacement that occurs when the color of the light source lit is switched a plurality of times within one line. However, compared with black-and-white (single-color) reading, color reading requires reading to be performed three time per line. This leads to poor productivity, and makes it impossible to read a color image fast. Thus, the image reading device mentioned above cannot cope with the disadvantage in terms of productivity. Furthermore, while the displacement to be eliminated is minute (for example, one dot or less), to eliminate it, the transparent flat grass plate needs to be positioned and operated accurately, and to that end, the transparent flat grass plate needs to be fitted accurately, and its rotation angle needs to be controlled accurately. Doing so, however, is rather unfeasible; in addition, securing high accuracy is also disadvantageous in terms of manufacturing cost.

SUMMARY

To overcome the disadvantages mentioned above, an image reading device includes a light source section, an image sensor, a data generation section, a memory, and a remaining color component generation section. The light source section shines light on a document along the line direction, includes light sources of a plurality of colors, and emits light in one color during a period for reading one line and switches the color of the light source lit cyclically from one line to the next. The image sensor reads, based on the light reflected from the document, one color per line. The data generation section generates, based on the output of the image sensor, image data of the light source color which is the color of the light source lit during reading. The memory stores a plurality of lines' worth of the image data generated by the data generation section. The remaining color component generation section generates, by using the plurality of lines' worth of the image data stored in the memory, the pixel value of a color component other than the light source color based on the pixel values of pixels around a pixel of interest.

Further features and advantages of the present disclosure will become apparent from the description of embodiments given below.

DETAILED DESCRIPTION

Hereinafter, embodiments of the present disclosure will be described with reference to FIGS. 1 to 11. The following description deals with, as an example, a multifunction product 100 (a multifunction printer/peripheral; corresponding to an image forming apparatus) including an image reading device 1. Any features mentioned in the course of description in terms of structure, arrangement, etc. are merely examples for explaining purposes, and are not meant to limit the scope of the disclosure.

(Outline of a Multifunction Product 100)

Figure 1:
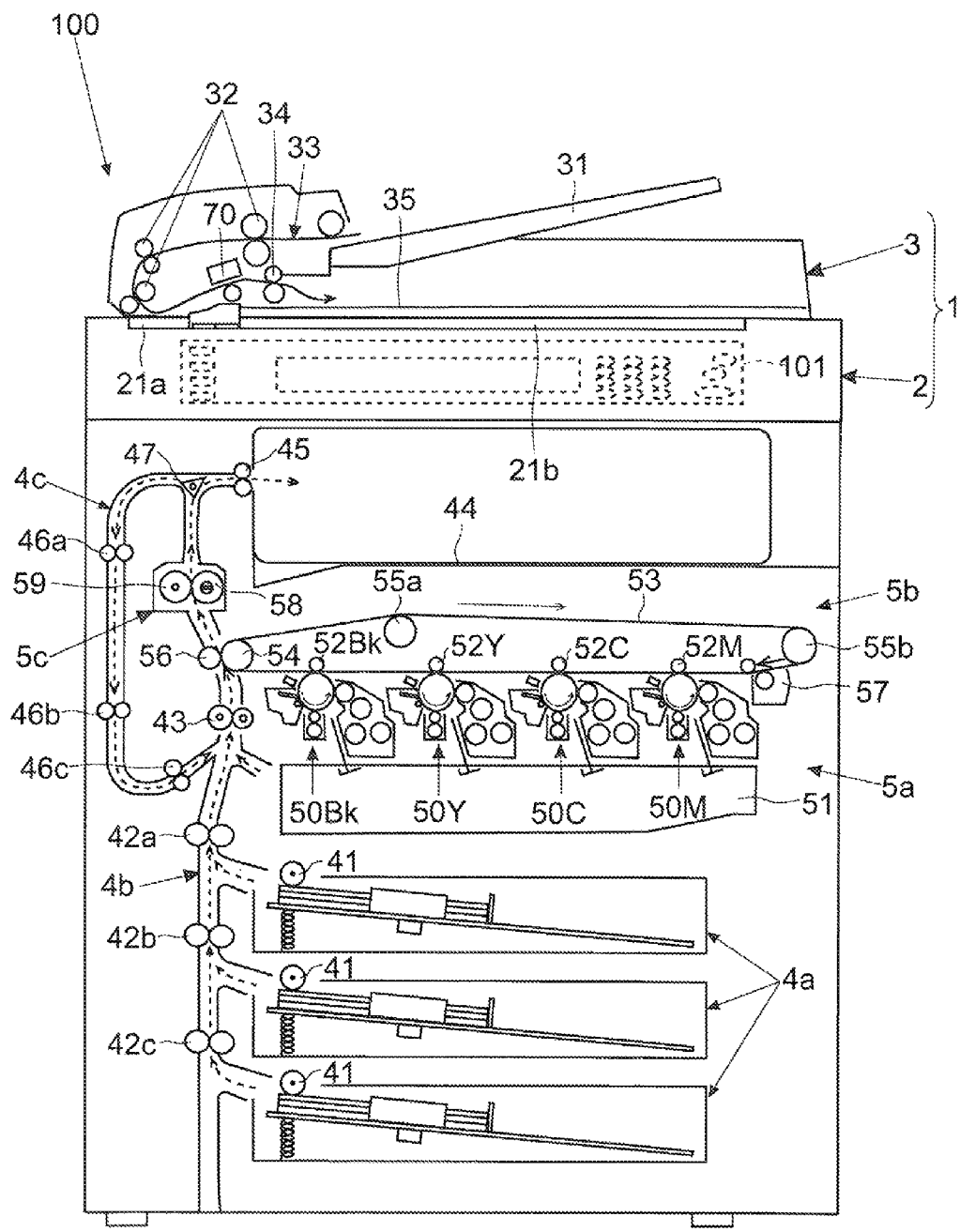
FIG. 1 is a diagram showing an outline of the construction of a multifunction product.

First, with reference to FIG. 1, an outline of a multifunction product 100 according to the present disclosure will be described. FIG. 1 is a diagram showing an outline of the construction of the multifunction product 100.

As shown in FIG. 1, in as upper part of the multifunction product 100, an image reading device 1 is arranged. The image reading device 1 will be described in detail later.

Moreover, as indicated by broken lines in FIG. 1, at the front side of an image reading section 2, an operation panel 101 is provided. The operation panel 101 accepts input of various settings by a user.

The multifunction product 100 includes, inside its main body, sheet feed sections 4a, a transport section 4b, an image formation section 5a, an intermediary transfer section 5b, and a fusing section 5c. The sheet feed sections 4a each accommodate a plurality of sheet of paper. During printing, a sheet feed roller 41 in one of the sheet feed sections 4a rotates to teed one sheet after another to the transport section 4b.

The transport section 4b is a passage through which sheets are transported within the apparatus. The transport section 4b is provided with guide plates for guiding sheets, pairs of transport rollers 42 (in FIG. 1, a total of three pairs 42a, 42b, and 42c from top), a pair of registration rollers 43 for keeping a transported sheet at stand-by short of the image formation section 5a to feed it in synchronism with the timing of the transfer of the formed toner image, etc. There is also provided a pair of ejection rollers 45 for ejecting sheets having undergone fusing onto an ejection tray 44.

As part of the transport section 4b, there is provided a double-side transport section 4c that connects between the downstream side of the fusing section 5c and the upstream side of the pair of registration rollers 43. The double-side transport section 4c transports toward the pair of registration rollers 43 a sheet having undergone printing on one side and been reversed top face down by the switchback operation of a pair of ejection rollers. In the double-side transport section 4c, a plurality of pairs of double-side transport rollers 46 for transporting sheets are provided (in FIG. 1, a total of three pairs 46a, 46b, and 46c from top). At the branch point between the path to the pair of ejection rollers 45 and the path to the double-side transport section 4c, a switch valve 47 is provided which rotates to guide a sheet into one of the two paths.

The image formation section 5a includes a plurality of image forming units 50 (50Bk, 50Y, 50C, and 50M for black, yellow, cyan, and magenta respectively) and an exposing device 51. Based on, for example, image data read in the image reading section 2, the exposing device 51 outputs laser light while turning it on and off to scan photosensitive drums with, and expose them to, the laser light. Each image farming unit 50 is provided with a photosensitive drum, which is supported so as to be capable of being driven to rotate, and a charging device, a developing device, a cleaning device, etc., which are arranged around the photosensitive drum. The image forming units 50 and the exposing device 51 together form toner images on the circumferential surfaces of the photosensitive drums.

The intermediary transfer section 5b receives primary transfer of toner images from the image forming units 50 respectively, and performs secondary transfer onto a sheet. The intermediary transfer section 5b is composed of primary transfer rollers 52Bk to 52M, an intermediary transfer belt 53, a driving roller 54, a plurality of driven rollers 55a and 55b, a secondary transfer roller 56, a belt cleaning device 57, etc. The primary transfer rollers 52Bk to 52M are disposed opposite the corresponding photosensitive drums across the intermediary transfer belt 53, which is endless. The primary transfer tollers 52Bk to 52M are each fed with a transfer voltage. This causes the toner images to be transferred onto the intermediary transfer belt 53.

The intermediary transfer belt 53 is wound across the driving roller 54, the primary transfer rollers 52Bk to 52M, etc. The intermediary transfer belt 53 moves around by being driven by the driving roller 54 rotating. The driving roller 54 and the secondary transfer roller 56 nip the intermediary transfer belt 53 between them. The toner images (black, yellow, cyan, and magenta) formed in the image forming units 50 respectively are primarily transferred, in a proper order and in a superimposed fashion, onto the intermediary transfer belt 53, and are then transferred onto a sheet by the secondary transfer roller 56 having a predetermined voltage applied thereto.

The fusing section 5c fuses the toner images transferred on the sheet. The fusing section 5c includes a hearing roller 58, which incorporates a heating element and a pressing roller 59, which presses against the heating roller 58. As the sheet passes through the nip between the heating roller 58 and the pressing roller 59, the toner is heated and melted, and thus the toner images are fused onto the sheet. The sheet is then ejected out of the fusing section 5c onto the ejection tray 44.

(Construction of the Image Reading Device 1)

Figure 2:
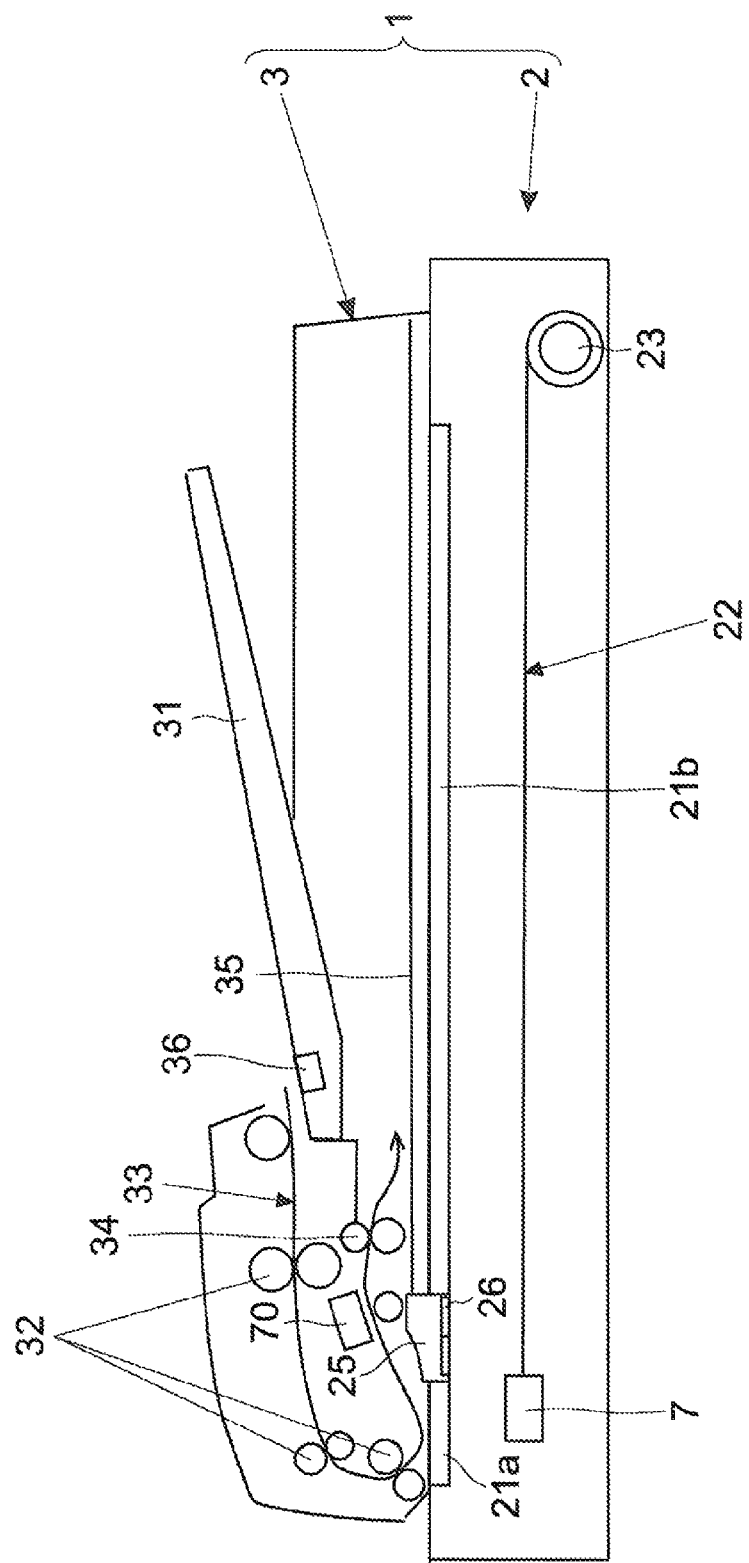
FIG. 2 is a diagram showing an example of an image reading device.

Next, with reference to FIG. 2, an example of the image reading device 1 according to one embodiment will be described. FIG. 2 is a diagram showing the image reading device 1.

The image reading device 1 includes a image reading section 2 and a document transport section 3. The image reading section 2 shines light on the top face of a feed-reading contact glass 21a or of a stationary-reading contact glass 21b, reads the obverse side of a document based on the reflected light, and generates image data. The document transport section 3 is provided over the image reading section 2. The document transport section 3 can swing up and down between an open and a closed position with respect to the image reading section 2. The document transport section 3 transports the document toward the feed-reading contact glass 21a. The document transport section 3 can also read the reverse side of a document and generate image data.

A document on a document tray 31 is fed one sheet after another to a document transport section 3. The document transport section 3 transports the document automatically and successively, one sheet after another, while keeping each sheet in contact with the feed-reading contact glass 21*a* at the top race of the image reading section 2. A pair of document ejection rollers 34 ejects the read sheets of the document onto a document election tray 35. The document transport section 3 can be lifted up about a pivot (not shown) provided at the sheets' leading edge side, so that a document can be placed on the stationary-reading contact glass 21*b* at the top face of the image reading section 2.

Next, the image reading section 2 shines light on the document passing across the feed-reading contact glass 21*a* or the document placed on the stationary-reading contact glass 21*b*, reads the document based on the reflected light, and generates image data. To achieve that, the image reading section 2 is provided with a reading unit 7 including an image sensor 72 of a CIS (contact image sensor) type.

The reading unit 7 is connected to a winding drum 23 by a wire 22. The winding drum 23 is rotated by a winding motor 24 (see FIG. 4) which rotates in forward and reverse directions. This permits the reading unit 7 to freely move in the horizontal direction (the left/right direction with respect to the multifunction product 100). When a document is read by use of the document transport section 3, the reading unit 7 is kept in a fixed, position under the feed-reading contact glass 21*a*. On the other hand, when a document on the stationary-reading contact glass 21*b* is read, reading is performed while the reading unit 7 is moved in the horizontal direction by the winding drum 23.

Between the feed-reading contact glass 21*a* and the stationary-reading contact glass 21*b*, a guide member 25 is provided. On the bottom face of the guide member 25, a white reference panel 26 is provided which is pure white to serve as a white reference. The white reference panel 26 is a plate that extends in the main scanning direction of the image reading device 1 (that is, the direction perpendicular to the document transport direction; that is, the direction perpendicular to the plane of FIG. 2).

(Hardware Configuration of the Multifunction Product 100)

Figure 3:
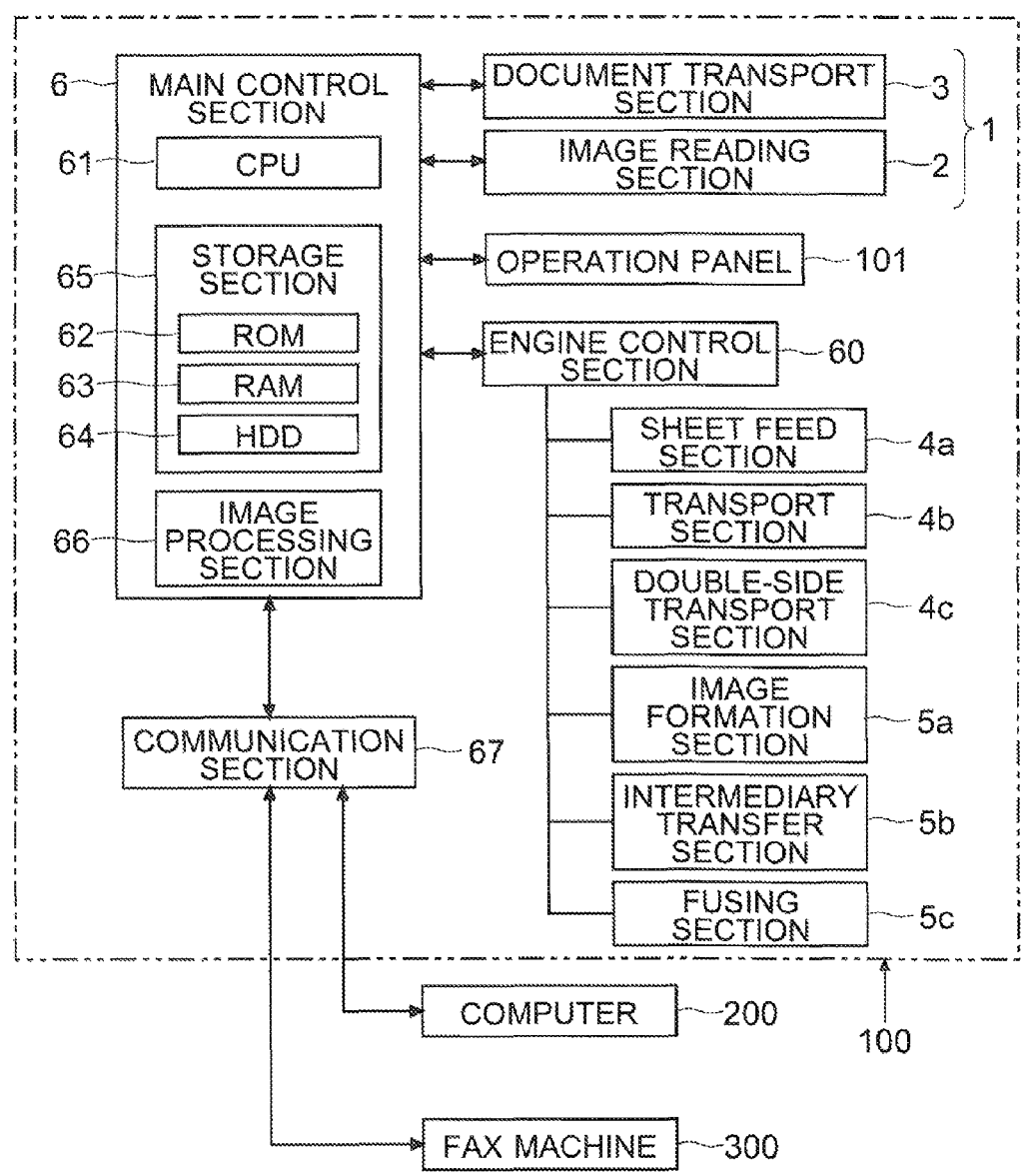
FIG. 3 is a diagram showing an example of the hardware configuration of a multifunction product.

Next, with reference to FIG. 3, an example of the hardware configuration of the multifunction product 100 according to one embodiment will be described. FIG. 3 is a diagram showing the hardware configuration of the multifunction product 100.

A main control section 6 governs the overall control of the multifunction product 100, controlling different sections within the multifunction product 100, controlling communication, and performing image processing. The main control section 6 includes a CPU 61 as a central arithmetic processing unit. In the main control section 6, a storage section 65 is provided which includes a ROM 62, a RAM 63, a HDD 64, and other nonvolatile and volatile storage devices such as a flash ROM (any of these may be provided outside the main control section 6).

The storage section 65 stores programs, data, etc. for controlling the multifunction product 100. By using the programs and data in the storage section 65, the main control section 6 controls different sections to achieve printing and data transmission. The storage section 65 (for example, the HDD 64) can store and accumulate image data based on reading by the image reading device 1.

The main control section 6 is provided with an image processing section 66 which performs image processing on the image data obtained through reading by the image reading device 1 or the image data stored in the storage section 65. For example, the image processing section 66 includes an integrated circuit dedicated to image processing, such as an ASIC, and a memory. For printing, and for external, transmission of image data, the image processing section 66 can perform various kinds of image processing such as various kinds of correction (such as gamma correction), density conversion, enlargement and reduction, rotation, data format conversion, various kinds of filtering, etc.

The multifunction product 100 is also provided with a communication section 67 for exchange of image data with an external computer 200 or an external FAX (facsimile) machine 300. The communication section 67 receives image data and print setting data from the computer 200 or the FAX machine 300 (printer and FAX functions). The communication section 67 can transmit image data to the computer 200 or the FAX machine 300 (transmission function). The main control section 6 is communicatably connected to the operation panel 101. What is entered on the operation panel 101 and instructions for execution of jobs entered there are communicated to the main control section 6.

The main control section 6 is communicatably connected to an engine control section 60 which controls printing. According to instructions from the main control section 6, the engine control section 60 controls the formation of toner images, and controls the turning on and off of motors etc. for rotating the relevant rotary members. The engine control section 60 may be omitted, in which case the main control section 6 may instead control printing. The engine control section 60 controls the operation of the sheet feed section 4*a*, the transport section 4*b*, the double-side transport section 4*c*, the image formation section 5*a*, the intermediary transfer section 5*b*, the fusing section 5*c*, etc. During printing, the main control section 6 feeds the engine control section 60 with instructions for printing according to settings made on the operation panel 101. According to instructions from the main control section 6, the engine control section 60 controls the operation of different sections.

The main control section 6 is also communicatably connected to the image reading section 2 and the document transport section 3. During reading of a document, the main control section 6 gives instructions for operation to the image reading section 2 and the document transport section 3. According to such instructions, the image reading section 2 reads the document. For example, the main control section 6 makes the storage section 65 store the image data of the document as outputted from the image reading section 2, and makes the image processing section 66 process the image data. Then, based on the processed image data, the main control section 6 makes the relevant sections perform printing (copying) or image data transmission (transmission function), or makes the storage section 65 store the image data.

(Flow of Document Reading in the Image Reading Device 1)

Figure 4:
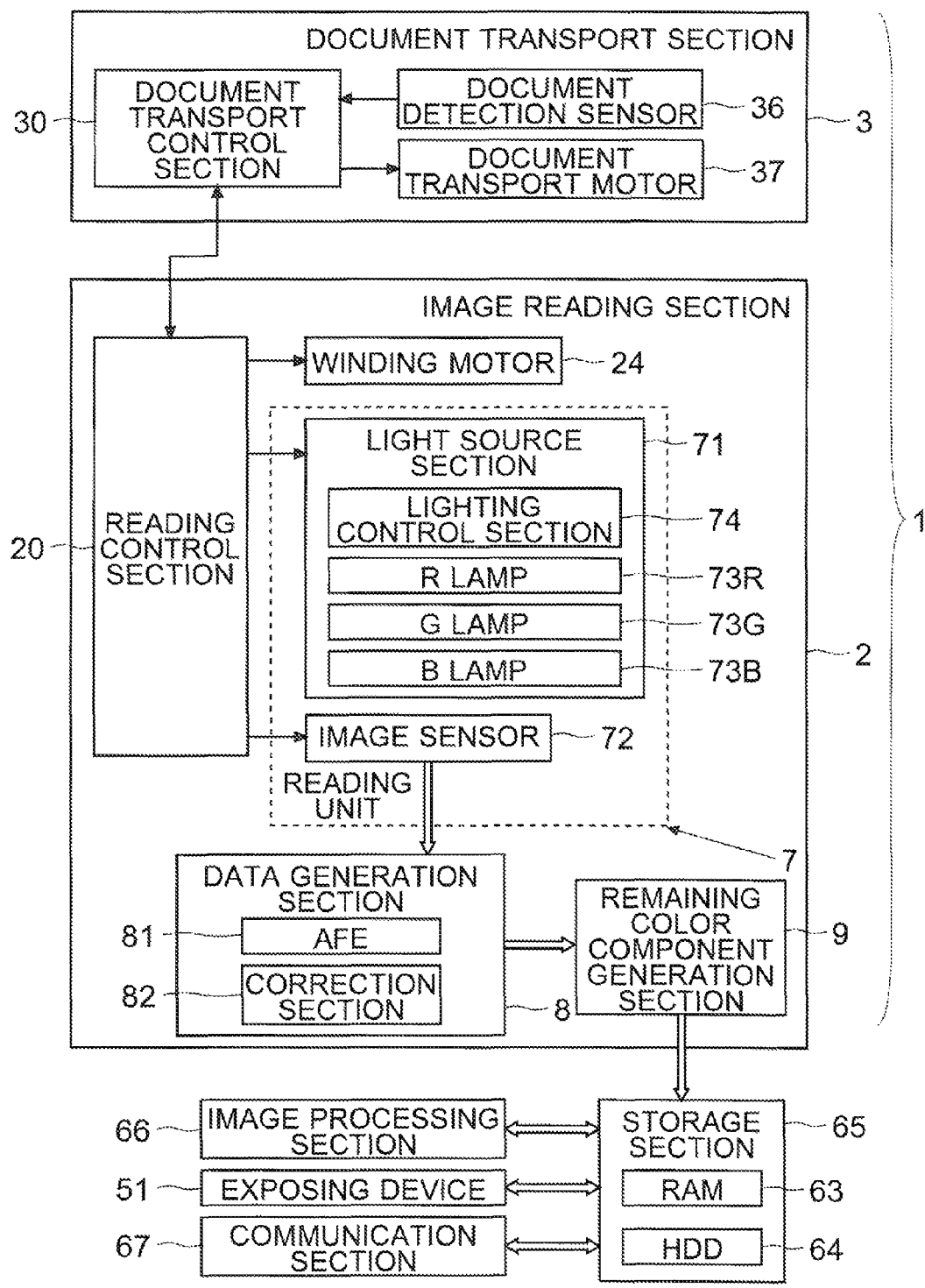
FIG. 4 is a diagram in illustration of the flow of document reading in an image reading device.

Next, with reference to FIG. 4, an example of the flow of document reading in the image reading device 1 according to one embodiment will be described. FIG. 4 is a diagram in illustration of the flow of document reading in the image reading device 1.

The image reading, section 2 of the image reading device 1 is provided with a reading control section 20 which controls the operation of the image reading section 2. On the other hand, the document transport section 3 is provided with a document transport control section 30 which controls the operation of the document transport section 3.

First, a description will be given of document reading operation in the document transport section 3. The document transport control section 30 is communicatably connected to the main control section 6 and the reading control section 20 so that, in response to instructions and signals from the main control section 6 and the reading control section 20, the document transport control section 30 controls the operation of the members provided in the document transport section 3.

The document transport control section 30 is, for example, a circuit board that includes a CPU as a central arithmetic processing unit and a ROM and a RAM as storage devices for storage of programs and data for control. The document tray 31 is provided with a document detection sensor 36 (see FIG. 2 etc.) for detection of placement of a document on the document tray 31.

The document detection sensor 36 is, for example, a photodetector. The document detection sensor 36 yields varying outputs between when a document is placed and when no document is placed. Based on the output (for example, whether it is high or low) of the document detection sensor 36, the document transport control section 30 recognizes whether or not a document is placed on the document tray 31.

In response to an instruction to read a document from the main control section 6, when a document is placed on the document tray 31, the document transport control section 30 drives a document transport motor 37 to make the relevant rotary members such as a pair of document transport rollers 32 rotate.

Next, a description will be given of the flow of document reading in the image reading section 2. The reading control section 20 provided within the image reading section 2 is communicatably connected to the main control section 6 and the document transport control section 30. In response to instructions and signals from the main control section 6, the reading control section 20 controls the operation of the members within the image reading section 2. The reading control section 20 is, for example, a circuit board that includes a CPU, and a ROM and a RAM as storage devices for storage of programs and data for control. In response to an instruction to read a document from the main control section 6, the reading control section 20 drives a winding motor 24 to make the winding drum 23 rotate so that the reading unit is moved to wherever it needs to be during reading.

The image reading section 2 includes, as sections related to document reading and image data generation, a reading unit 7, a data generation section 8, a remaining color component generation section 9, etc.

The reading unit 7 (the part enclosed by broken lines in FIG. 4) includes a light source section 71 and an image sensor 72. In response to an instruction to read a document from the main control section 6 (during document reading), the reading control section 20 makes the winding motor 24 operate to move the reading unit 7.

The light source section 71 includes light sources of a plurality of colors. Each light source shines light on the document along the line direction (main scanning direction). The light source section 71 includes lamps for three colors, namely an R lamp 73R (emitting red light, corresponding to a light source), a G lamp 73G (emitting green light, corresponding to a light source), and a B lamp 73B (emitting blue light, corresponding to a light source). The lamps in the light source section 71 may be an LED having lamps of three colors integrally combined together, or may be separate lamps, namely an R, a G, and a B lamp 73R, 73G, and 73B, arranged side by side.

There is provided a lighting control section 74 which, according to instructions from the reading control section 20, controls the lighting of (the color of the light emitted from) the R, G, and B lamps 73R, 73G, and 73B. The lighting control section 74 can permit lighting in one color alone (R (red) alone, G (green) alone, or B (blue) alone), or lighting in three colors simultaneously.

The image sensor 72 is a sensor of a CIS (contact image sensor) type. To cope with reading in colors, the image sensor 72 includes a single line sensor in which a plurality of light receiving elements corresponding to (sensitive to) the wavelength range of the light source section 71 are arranged in a row. The image sensor 72 may instead be one including three line sensors in which a plurality of light receiving elements for R (red), G (green), and B (blue), respectively, are arranged. The image sensor 72 also includes a lens or the like for guiding the light reflected from the document.

While a document is transported, or while the reading unit 7 is moved, the image sensor 72 reads the document line by line in the main scanning direction (the direction perpendicular to the document transport direction). The image sensor 72 converts the reflected light into an analog electrical signal that reflects the amount of light (image density). Repeating line-by-line reading successively in the sub-scanning direction (the document transport direction) allows the reading of an entire sheet of the document.

The analog electrical signal of the individual pixels and lines of the image sensor 72 is fed to the data generation section 8. The data generation section 8 includes an AFE (analog front end) 81 and a correction section 82. The AFE 81 includes, for example, an amplifier for the analog signal, an automatic gain control circuit, an odd/even correction circuit for compensating for differences in characteristics between odd- and even-numbered signals output from the image sensor 72, a correction circuit for compensating for differences in characteristics among the individual light receiving elements, an A/D conversion circuit for converting the corrected, adjusted analog signal into a digital, signal, etc.

The correction section 82 is a circuit that compensates for distortion that depends on the position and characteristics of the pixels by adjusting the digital values (pixel values) of the individual pixels. For example, the correction section 82 performs shading correction on the individual pixel values of the image data output from (generated by) the data generation section 8. For example, the correction section 82 holds, as a white reference value, the digital values of the individual pixels of the line sensor as they are when the white reference panel 26 is read. For each of R (red), G (green), and B (blue), the corresponding lamp is lit, so that the white reference value for each color is held. Then, the correction section 82 performs shading correction through the following calculation:

$$\text{(Corrected Pixel value)} = \text{(Uncorrected Pixel value)} \times \text{(Maximum Pixel value/White Reference Value)}$$

In shading correction, the correction section 82 may also acquire, as a black reference value, the outputs of the individual light receiving elements as they are when the light source section 71 is off so as to perform shading correction by use of the white and black reference values.

The remaining color component generation section 9 generates the pixel values of color components other than the light source color (the color of the light source lit during line reading) of the individual pixels.

The storage section 65 stores image data generated through reading by the image reading device 1. For example, color image data is temporarily stored in the RAM 63 in the main control section 6. Thereafter, the image data is subjected to separate image processing by the image processing section 66 provided in the main body, and is then fed to the exposing device 51 for printing (for copying), or fed to the communication section 67 for transmission (for scanned data transmission), or stored in the storage section 65 (for example, the HDD 64).

(Procedure for Black-and-White Reading)

Figure 5:
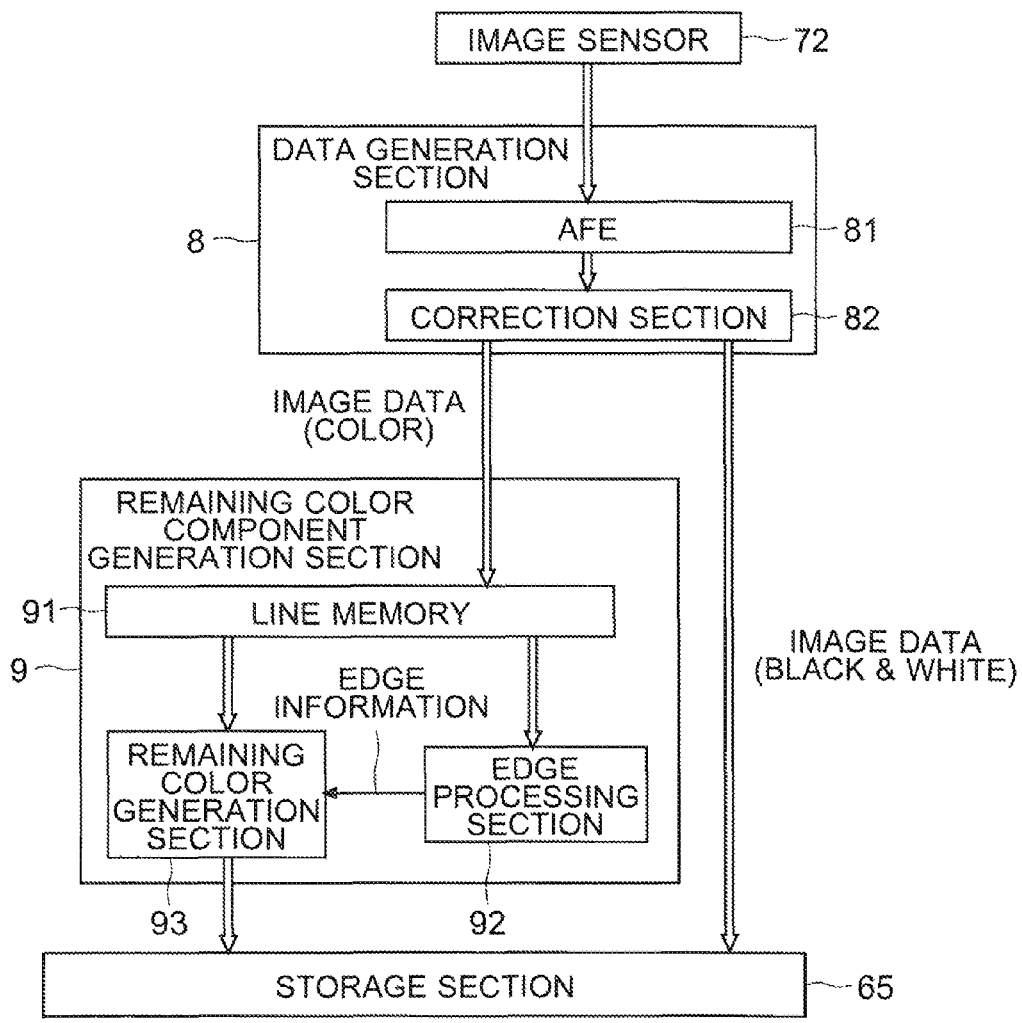
FIG. 5 is a diagram showing the flow of image data during reading in an image reading device.

Next, with reference to FIGS. 4 and 5, an example of the flow of image data in black-and-white reading will be described. FIG. 5 is a block diagram showing an example of the flow of image data during reading in the image reading device 1.

When a document is read in black and white (a corresponding setting can be made on the operation panel 101), first, the reading control section 20 turns on all the lamps (the R, G, and B lamps 73R, 73G, and 73B) in the light source section 71. The outputs of the individual light receiving elements of the image sensor 72 are fed to the data generation section 8, where they are converted into digital data. Then, the data generation section 8 feeds the digital data (image data) to the correction section 82. The correction section 82 performs correction on the image data. The image data corrected by the correction section 82 is fed, sequentially, to the storage section 65 (for example, the RAM 63).

The image data stored in the storage section 65 is subjected to, according to the purpose of the job in progress, various kinds of image processing by the image processing section 66. The image data having undergone the image processing is used far a printing or transmission job.

(Procedure for Color Reading)

Figure 6:
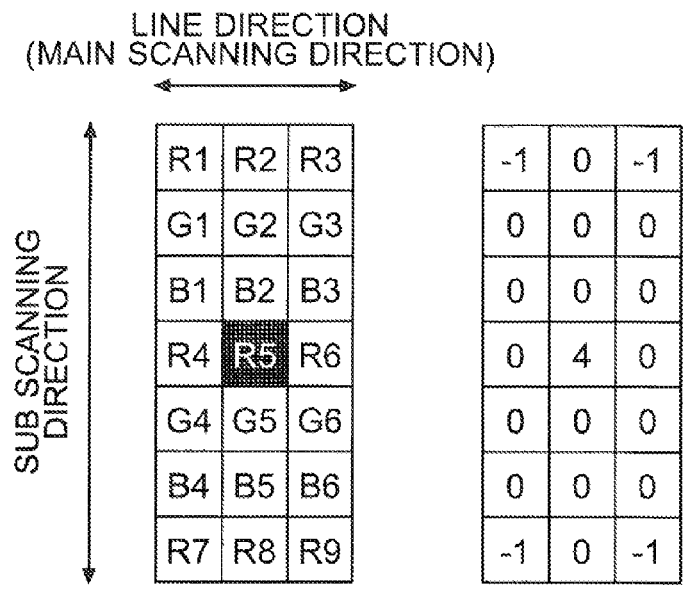
FIG. 6 is a diagram showing an example of edge extraction.
Figure 7:
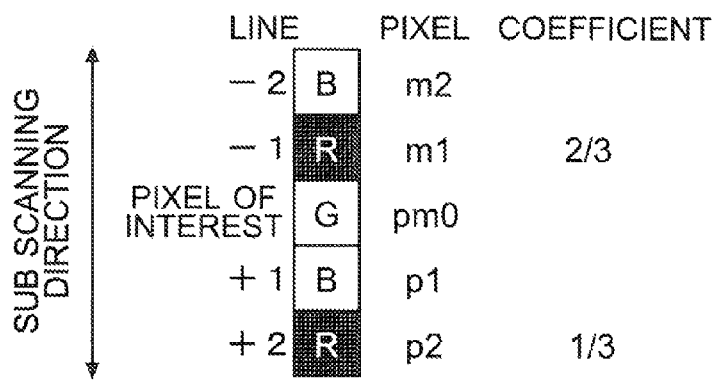
FIG. 7 is a diagram showing an example of remaining color component generation elsewhere than at an edge.
Figure 8:
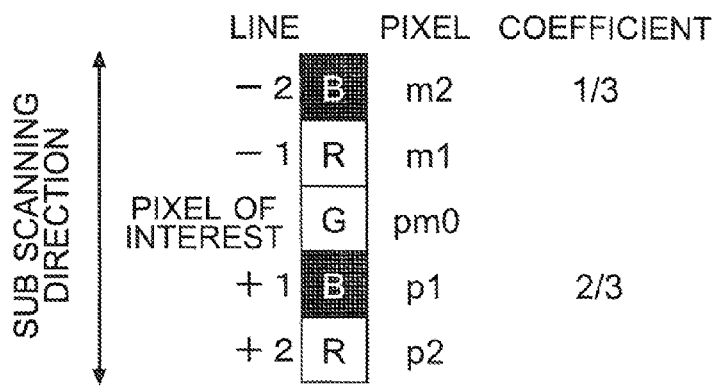
FIG. 8 is a diagram showing an example of remaining color component generation elsewhere than at an edge.
Figure 9:
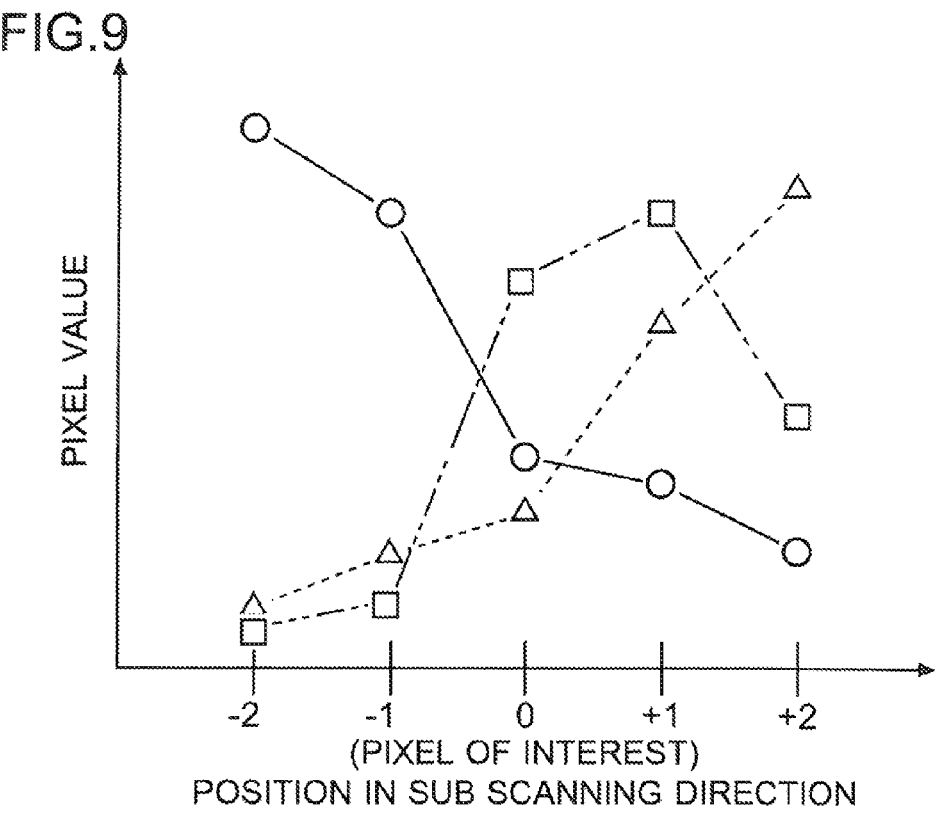
FIG. 9 is a diagram in illustration of an example of a method of recognizing whether or not an edge is a monochrome edge.
Figure 10:
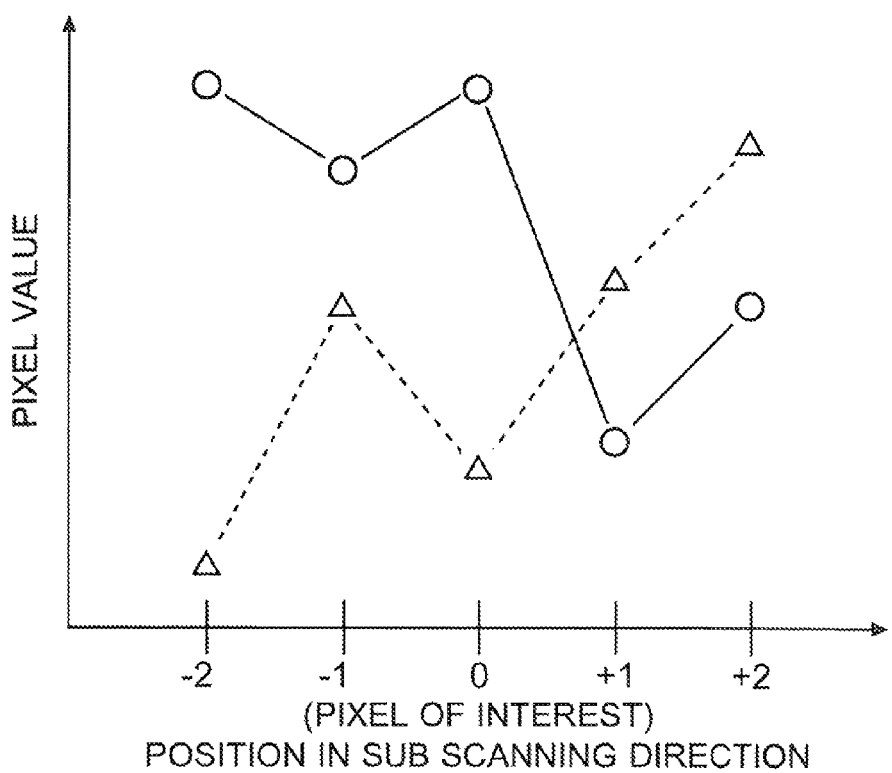
FIG. 10 is a diagram in illustration of an example of a method of recognizing whether or not an edge is a monochrome edge.

Next, with reference to FIGS. 4 to 10, an example of the flow of image data in color reading will be described. FIG. 6 is a diagram in illustration of an example of the procedure for edge extraction. FIGS. 7 and 8 are diagrams in illustration of an example of the procedure for remaining color component generation elsewhere than at an edge. FIGS. 9 and 10 are diagrams in illustration of an example of the procedure for recognizing whether an edge is a monochrome one or not.

When a document is read in colors (a corresponding setting can be made on the operation panel 101), the reading control section 20 makes the light source section 71 turn on the lamps in such a way as to emit light in one color during a previously determined period for reading one line in the main scanning direction and switch the color of the light source lit in a previously determined order from one line to the next. In other words, the light source section 71 emits light in one color during the period for reading one line in the main scanning direction, and switches the color of the light source lit cyclically in a predetermined order from one line to the next.

For example, when the lamps are lit in the order R (red) to G (green) to B (blue), the reading control section 20 turns on, with respect to three consecutive lines in the main scanning direction, the R lamp 73R for the first line, the G lamp 73G for the second line, and the B lamp 73B for the third line. The reading control section 20 makes the light source section 71 repeat the cyclical, sequential switching of the color of the emitted light every three lines from the leading to the trailing edge of the document.

The outputs of the individual light receiving elements of the image sensor 72 are fed to the data generation section 8, where they are converted into digital data. Based on the outputs from the image sensor 72, the data generation section 8 generates the image data of the color of the light source lit (the light source color) during reading. As mentioned above, when the document is irradiated with light, the light source section 71 emits light in one color across one line in the main scanning direction and switches the light source color from one line to the next. Thus, the data generation section 8 generates image data of a different color each line.

Specifically, the data generation section 8 generates, for a line of which the light source color is R (red), image data for a R (red) line; for a line of which the light source color is G (green), image data for a G (green) line; and for a line of which the light source color is B (blue), image data for a B (blue) line.

The data generation section 8 feeds digitized data (image data, the data generated by the AFE 81) to the correction section 82. The correction section 82 performs correction on the image data.

The remaining color component generation section 9 is a portion that generates, for each pixel, the pixel values of the color components other than the light source color. For example, the remaining color component generation section 9 generates, for the image data of a line of which the light source color is R (red), the pixel values of the G (green) and B (blue) components of each pixel; for the image data of a line of which the light source color is G (green), the pixel values of the R (red) and B (blue) components of each pixel; and for the image data of a line of which the light source color is B (blue), the pixel values of the R (red) and G (green) components of each pixel.

In this embodiment, the remaining color component generation section 9 includes a line memory 91 (corresponding to a memory), an edge processing section 92, and a remaining color generation section 93, etc.

The line memory 91 in the remaining color component generation section 9 at least stores image data worth seven lines in the main scanning direction. The image data of one line after another corrected by the correction section 82 is sequentially transferred to the line memory 91 in the remaining color component generation section 9.

The edge processing section 92 checks whether or not the pixel of interest (the pixel for which the color components other than the light source color are about to be generated) is an edge. An edge is a part of an image where there is recognized to be a large change in density (pixel value).

Now, with, reference to FIG. 6, an example of edge recognition procedure performed by the edge processing section 92 will be described. With reference to FIG. 6, a description will be given of a case where the light source color (the color of the light source lit) of the pixel of interest is R (red). The recognition procedure proceeds in a similar manner for the other colors. The following description merely deals with one example of edge recognition, and any other procedure may instead be used.

As shown in FIG. 6, in this embodiment, the edge processing section 92 checks whether or not the pixel of interest is an edge by use of a differential filter. As shown in the differential filter in FIG. 6, the edge processing section 92 checks whether or not the pixel of interest is an edge by use of the pixel value of the pixel of interest itself and the pixel values of the same light source color as the pixel of interest that are located one dot away in the main scanning direction and three dots away in the sub scanning direction (the movement direction of the document or the reading unit 7).

In FIG. 6, the pixel of interest is indicated by hatching (the pixel at position R5). By use of the differential filter, the edge processing section 92 performs the following calculation: (Pixel value of Pixel of interest R5×4)+(Pixel value of Pixel R1×(−1))+(Pixel value of Pixel R3×(−1))+(Pixel value of Pixel R7×(−1))+(Pixel value of Pixel R9×(−1)). The smaller the change in density is, the smaller the absolute value of the calculated result is. Accordingly, the edge processing section 92 checks whether or not the pixel of interest is an edge based on whether or not the absolute value of the calculation result exceeds a previously determined threshold value; when the threshold value is not exceeded, the edge processing section 92 recognizes no edge, and when the threshold value is exceeded, the edge processing section 92 recognizes an edge.

The threshold value is a value that can be determined arbitrarily, and is previously determined.

Data indicating the result of recognition by the edge processing section 92 is fed to the remaining color generation section 93. According to whether or not the pixel of interest is an edge, the remaining color generation section 93 changes the method of generating the pixel values of the color components other than the light source color of the pixel of interest.

[When the Pixel of Interest is Not an Edge]

When the edge processing section. 92 recognizes the pixel of interest not to be an edge, the remaining color generation section 93 determines the pixel values of the color components (remaining color components) other than the light source color of the pixel of interest by linear interpolation. Now, with reference to FIGS. 7 and 8, a description will be given of how the pixel values of the color components (remaining color components) other than the light source color of the pixel of interest are determined when the pixel of interest is not an edge.

With reference to FIGS. 7 and 8, a description will be given of an example of when the light source color (the color of the light source lit) of the pixel of interest is G (green), calculating the color components other than the light source color of the pixel of interest. When the light source color of the pixel of interest is R (red) or B (blue), the color components other than the light source color are calculated in a similar manner.

The remaining color generation section 93 generates the pixel value of a color component other than the light source color of the pixel of interest to be the mid value between the pixel values of interpolation target pixels, that is, two pixels that sandwich the pixel of interest in the direction (sub scanning direction) perpendicular to the direction of lines in the main scanning direction and that are read in, as the light source color, the color about to be generated.

Specifically, in the example shown in FIGS. 7 and 8, the light source color of the pixel of interest is G (green). The colors (remaining color components) other than the light source color which are about to be generated are R (red) and B (blue). When the color of the light source is switched in the order . . . R to G to B to R to G to B to R . . . from one line to the next in the main scanning direction, the line (in FIGS. 7 and 8, line "−1") that is the last before (one dot anterior in the sub scanning direction) of the pixel of interest (pm0) and the line (in FIGS. 7 and 8, line "+2") that is the second after the pixel of interest (pm0) (two dots posterior in the sub scanning direction) are lines of which the light source color is R (red). Likewise, the line (in FIGS. 7 and 8, line "−2") that is the second last before (two dots anterior in the sub scanning direction) of the pixel of interest (pm0) and the line (in FIGS. 7 and 8, line "+1") that is the first after the pixel of interest (pm0) (one dot posterior in the sub scanning direction) are lines of which the light source color is B (blue).

In calculating the pixel value of R (red) of the pixel of interest, the remaining color generation section 93 determines the pixel value of R (red) of the pixel of interest (pm0) to be the mid value between the pixel value of the pixel (the interpolation target pixel identified as "m1" in FIGS. 7 and 8) at the same position in the main scanning direction on the line that is the last before that of the pixel of interest (pm0) and the pixel value of the pixel (the interpolation target pixel identified as "p2" in FIGS. 7 and 8) at the same position in the main scanning direction on the line that is the second after that of the pixel of interest (pm0).

Moreover, in calculating the pixel value of B (blue) of the pixel of interest, the remaining color generation section 93 determines the pixel value of B (blue) of the pixel of interest (pm0) to be the mid value between the pixel value of the pixel (the interpolation target pixel identified as "m2" in FIGS. 7 and 8) at the same position in the main scanning direction on the line that is the second last before that of the pixel of interest (pm0) and the pixel value of the pixel (the interpolation target pixel identified as "p1" in FIGS. 7 and 8) at the same position in the main scanning direction on the line that is the first after that of the pixel of interest (pm0).

Here, the remaining color generation section 93 calculates two values that are obtained by multiplying each of the two interpolation target pixels by a coefficient that is so set that the closer to the pixel of interest the greater the contribution. Then, the remaining color generation section 93 generates the sum of the two values as the pixel value of the color components other than the light source color of the pixel of interest.

Specifically, in the example shown in FIGS. 7 and 8, in this embodiment, the light sources emit light in three colors, and are lit in a predetermined order or colors (for example, R to G to B). Thus, the interval between lines of the same light source color is three lines (three dots). Thus, the distance in the sub scanning direction between pixels of a color different from the light source color of the pixel of interest which sandwich the pixel of interest is three dots. Accordingly, the remaining color generation section 93 sets the coefficient at ⅓ or ⅔. The remaining color generation section 93 calculates the values by multiplying, of the pixels of which the light source color is the color about to be generated and that sandwich the pixel of interest, the pixel value of the closer pixel by ⅔ and the pixel value of the farther pixel by ⅓. The remaining color generation section 93 then adds up the two obtained values to generates the pixel value for the colors other than the light source color of the pixel of interest.

With reference to FIGS. 7 and 8, a specific example will be described. When calculating the pixel value of the R (red) component for a green pixel of interest, the remaining color generation section 93 calculates a value by multiplying by ⅔ the pixel value of the closer interpolation target pixel m1 at the same position in the main scanning direction on the line that is the last before that of the pixel of interest (pm0). The remaining color generation section 93 also calculates a value by multiplying by ⅓ the pixel value of the farther interpolation target pixel p2 at the same position in the main scanning direction on the line that is the second after that of the pixel of interest (pm0). The remaining color generation section 93 then adds up the two calculated values, and determines the result as the pixel value of the R (red) of the pixel of interest.

On to other hand, when calculating the pixel value of the B (blue) component for a green pixel of interest, the remaining color generation section 93 calculates a value by multiplying by ⅓ the pixel value of the farther interpolation target pixel m2 at the same position in the main scanning direction on the line that is the second last before that of the pixel of interest (pm0). The remaining color generation section 93 also calculates a value by multiplying by ⅔ the pixel value of the closer interpolation target pixel p1 at the same position in the main scanning direction on the line that is the first after that of the pixel of interest (pm0). The remaining color generation section 93 then adds up the two calculated values, and determines the result as the pixel value of the B (blue) of the pixel of interest.

In the example shown in FIGS. 7 and 8, the calculation expressions as follows:

(R(Red)Component of Pixel of interest)
= (2/3 × Pixel value of m1) + (1/3 × Pixel value of p2)

(B(Blue)Component of Pixel of interest)
= (1/3 × Pixel value of m2) + (2/3 × Pixel value of p1)

[When the Pixel of Interest is an Edge]

Next, a description will be given of how the pixel values of the color components other than the light source color of the pixel of interest are determined when the edge processing section 92 recognizes the pixel of interest to be an edge.

When the edge processing section 92 recognizes the pixel of interest to be an edge, the edge processing section 92 checks whether or not it is a monochrome edge at the border of white or black. Specifically, the edge processing section 92 extracts pixels that are located across, with the pixel of interest at the center, a total of five lines in the direction perpendicular to the lines in the main scanning direction and that are read in the light source color. The edge processing section 92 compares the pixel values of the live extracted pixels, and recognizes, when previously determined conditions are met, the pixel of interest to be a monochrome edge. A first condition is that two or less of the five extracted pixels are inflection point pixels, an inflection point pixel being a pixel of which the pixel value is by a prescribed value smaller or greater than the pixel values of both of the pixels adjacent to it. A second condition is that no two adjacent pixels are inflection point pixels. On the other hand, when the conditions are not met, the edge processing section 92 recognizes the pixel of interest not to be a monochrome edge.

Here, the purpose of taking any of the extracted pixels whose pixel value is by a prescribed value smaller or greater than the pixel values of both of the pixels adjacent to it as an inflection point pixel is to eliminate the influence of random noise and to prevent a pixel that should not be recognized as an inflection point pixel from being recognized as one due to differences in characteristics among individual pixels (light receiving elements as pixels included in the image sensor). Moreover, so long as the difference in pixel value is moderate, it may eventually prove to be preferable not to recognize a pixel to be an inflection point pixel. The prescribed value is a value that can be determined arbitrarily. For example, the remaining color component generation section 9 or the edge processing section 92 calculates the standard deviation over a prescribed region (for example, 100 by 100 pixels) with a particular pixel (which may be the pixel of interest) within image data at the center. The remaining color component generation section 9 or the edge processing section 92 then determines the prescribed value by multiplying the calculated standard deviation by a previously determined number (for example, when the standard deviation equals 5, by multiplying it by 5 to obtain 25). The previously determined number may be determined appropriately, and may be an integer or a decimal number. On the other hand, the prescribed value may be a constant value such as 20 or 30.

Now, with reference to FIGS. 9 and 10, a specific description will be given of the inflection point pixels and the conditions. FIGS. 9 and 10 are graphs. In FIGS. 9 and 10, along the horizontal direction is taken the position of pixels in the sub scanning direction. In FIGS. 9 and 10, along the vertical axis is taken the magnitude of the pixel values of individual pixels. FIGS. 9 and 10 are graphs that show pixels that are located at the same position in the main scanning direction (line direction) across, with a pixel of interest at the center, five lines in the sub scanning direction (the direction perpendicular to the lines) and that are read in the light source color across.

The graph in FIG. 9 shows an example of how the pixel values of individual pixels are distributed when the conditions are met. In the graph of FIG. 9, different combinations of five pixels are respectively indicated by circular symbols connected by solid lines, triangular symbols connected by broken lines, and square symbols connected by dash-dot-dot lines.

In FIG. 9, the number of inflection point pixels, that is, pixels whose pixel value is by a prescribed value smaller or greater than the pixel values of both of the pixels adjacent to them, is zero or one. In other words, in the graph shown in FIG. 9, when the coordinates of adjacent pixels are connected with a line, the number of pixels (inflection point pixels) at which the gradient of the connecting lines turns (changes) from positive to negative or vice versa is one or less. Moreover, no two adjacent pixels are inflection point pixels. Specifically, in the combination indicated by circular symbols connected by solid lines and in the combination indicated by triangular symbols connected by broken lines, the number of inflection point pixels is zero. In the combination indicated by squares connected by dash-dot-dot lines, the number of inflection point pixels (the pixel at position −1) is one.

On the other hand, in FIG. 10, the number of inflection point pixels, that is, pixels whose pixel value is by a prescribed value smaller or greater than the pixel values of both of the pixels adjacent to them, is two or more. Moreover, two adjacent pixels are inflection point pixels. In other words, in the graph shown in FIG. 10, when the coordinates of adjacent pixels are connected with a line, the number of pixels (inflection point pixels) that are connected to lines whose gradient turns from positive to negative or vice versa is two or more, and in addition those pixels are adjacent to each other. In the combination indicated by circular symbols connected by solid lines and in the combination indicated by triangular symbols connected by broken lines, the number of inflection point pixels is three and two respectively, and adjacent pixels are inflection point pixels.

Suppose here that, for example, pure white is expressed as (R=255, G=255, B=255) and pure black is expressed as (R=0, G=0, B=0). At a monochrome border (of white or black), the pixel values (luminance or density) of R (red), G (green), and B (blue) components are all expected to change in a similar way. Accordingly; when there are many inflection points or adjacent pixels are inflection point pixels, R (red), G (green), and B (blue) components do not change in a similar way. On this basis, the edge processing section 92 recognizes an edge to be a monochrome edge only when the number of inflection point pixels is two or less and no adjacent pixels are inflection point pixels, and otherwise recognizes an edge not to be a monochrome edge.

In the example described above, the pixel values of pixels that are located on the same position in the main scanning direction across, with the pixel of interest at the center, five lines in the sub scanning direction are extracted. The edge processing section 92 may instead extract the pixel values of pixels across more than five lines (for example, seven lines) and check whether the above-mentioned conditions are met to recognize whether or not an edge is a monochrome edge.

The result of recognition by the edge processing section 92, that is, whether or not the pixel of interest is a monochrome edge (a border with white or black), is conveyed to the remaining color generation section 93. According to whether or not it is a monochrome edge, the remaining color generation section 93 changes the method of determining the pixel values of the colors other than the light source color of the pixel of interest.

Specifically, when the edge processing section 92 recognizes the pixel of interest to be a monochrome edge, the remaining color generation section 93 generates the pixel value of the color components other than the light source color by taking the pixel value of the light source color of the pixel of interest as the pixel value of the color components other than the light source color. This is because, at a monochrome edge (including gray), the color components of different colors are expected to take largely the same values. By contrast, when the edge processing section 92 recognizes the pixel of interest not to be a monochrome edge, the remaining color generation section 93 generates the pixel value of the color components other than the light source color from, as when the edge processing section 92 recognizes the pixel of interest not to be an edge (through linear interpolation), the pixel value of the light source color of the pixel of interest. This is because, elsewhere than at a monochrome edge (including gray), there is expected to be a continuous change in gradation with the pixel of interest at the center.

(Procedure for Generating Color Components Other than Light Source Color)

Figure 11:
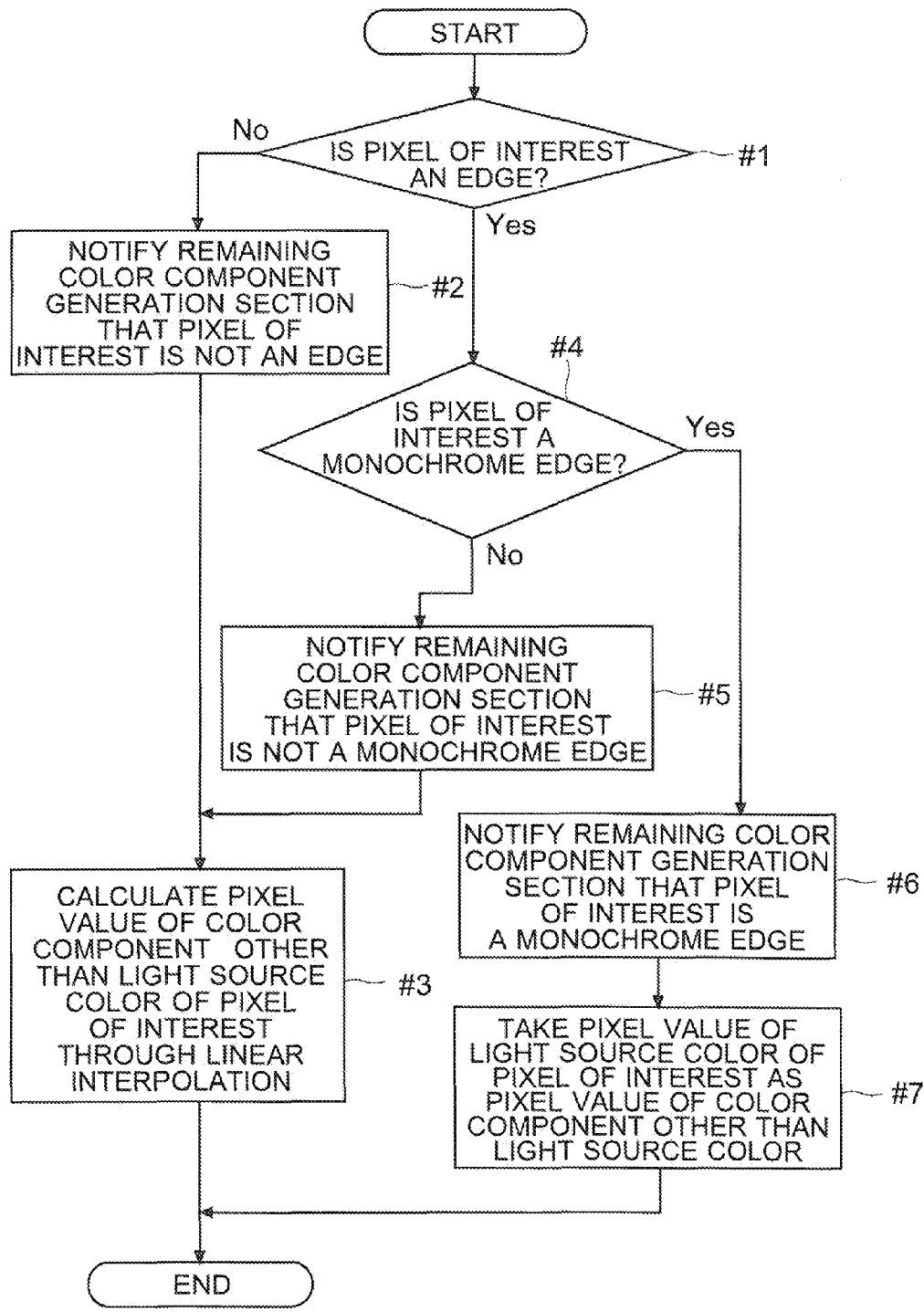
FIG. 11 is a flow chart showing the procedure for generating a color component other than the light source color with respect to one pixel of interest.

Next, with reference to FIG. 11, the procedure for generating color components other than the light source color will be described. FIG. 11 is a flow chart showing an example of the procedure for generating color components other than the light source color with respect to one pixel of interest. The procedure shown in FIG. 11 is executed for each pixel within one page. In a case where the document to be read contains a plurality of pages, the procedure show in FIG. 11 is executed for each pixel on every page.

The flow in FIG. 11 starts when, for any pixel of interest out of image data worth one page, a color component other than the light source color (the color of the light source during reading) starts to be generated. Prior to this point, the user has operated the operation panel 101 to enter an instruction to start reading the document in colors. The main control section 6 then instructs the document transport control section 30 and the reading control section 20 to start reading the document. In response, in the reading control section 20, while the light source section 71 switches the color of the light source lit from one line to the next in the main scanning direction, the image sensor 72 starts reading the document, leaving image data to be accumulated in the line memory 91.

First, the edge processing section 92 checks whether or not the pixel of interest is an edge (step #1). As described previously, the edge processing section 92 checks whether or not the pixel of interest is an edge through, for example, calculation using a differential filter.

When the pixel of interest is recognized not to be an edge (step #1, "No"), the edge processing section 92 conveys data indicating that the pixel of interest is not an edge to the remaining color generation section 93.

In response, the remaining color generation section 93, by using pixels of which the light source color is the color component about to be generated (that is, which are on those lines that are read while the light source of the color about to be generated is lit) and which are located at the same position in the main scanning direction and sandwich the pixel of interest in the sub scanning direction, calculates the pixel values of the color components other than the light source color of the pixel of interest through linear interpolation (see step #3 and FIGS. 7 and 8). For example, the remaining color generation section 93, when the light source color of the pixel of interest is R (red), calculates the pixel values of G (green) and B (blue) through linear interpolation; when the light source color of the pixel of interest is G (green), calculates the pixel values of R (red) and B (blue) through linear interpolation; and when the light source color of the pixel of interest is B (blue), calculates the pixel values of R (red) and G (green) through linear interpolation. The flow then ends ("END").

By contrast, when the pixel of interest is recognized to be an edge (step #1, "Yes"), the edge processing section 92 then checks whether or not the pixel of interest is a monochrome edge (step #4). As described previously, the edge processing section 92 checks whether or not the pixel of interest is a monochrome edge by checking the number of inflection point pixels and how they are located relative to each other (see FIGS. 9 and 10).

When the pixel of interest is recognized not to be a monochrome edge (step #4, "No"), the edge processing section 92 conveys data indicating that the pixel of interest is not a monochrome edge to the remaining color generation section 93 (step #5). In response, the remaining color generation section 93 calculates the pixel values of the color components other than the light source color of the pixel of interest through linear interpolation (to step #3).

By contrast, when the pixel of interest is recognized to be a monochrome edge (step #4, "Yes"), the edge processing section 92 conveys data indicating that the pixel of interest is a monochrome edge to the remaining color generation section 93 (step #6). In response, the remaining color generation section 93 determines the pixel value of the light source color of the pixel of interest as the pixel value of the color components other than the light source color (step #7). For example, the remaining color generation section 93, when the light source color of the pixel of interest is R (red), takes the pixel value of R (red) as the pixel value of G (green) and B (blue); when the light source color of the pixel of interest is G (green), takes the pixel value of G (green) as the pixel value of R (red) and B (blue); and when the light source color of the pixel of interest is B (blue), takes the pixel value of B (blue) as the pixel value of R (red) and G (green). The flow then ends ("END").

As described above, according to the embodiment under discussion, an image reading device 1, or a multifunction product 100, includes: a light source section 71 that shines light on a document along a line direction, that includes light sources of a plurality of colors, and that emits light in one color during a period for reading one line and switches the color of the light source lit cyclically from one line to the next; an image sensor 72 that, based on the light reflected from the document, reads data of one color per line; a data generation section 8 that, based on the output of the image sensor 72, generates image data of the light source color which is the color of the light source lit during reading; a memory (line memory 91) that stores a plurality of lines' worth of the image data generated by the data generation section 8; and a remaining color component generation section 9 that, by using the plurality of lines' worth of the image data stored in the memory, generates the pixel value of a color component other than the light source color based on the pixel values of pixels around a pixel of interest. With this configuration, in reading a document and acquiring image data in colors, the time required to read one line in a color document can be reduced to a fraction (one-third in a case involving three colors, namely R (red), G (green), and B (blue)) of the conventionally required time. It is thus possible to achieve the same speed as in reading in black and white. Thus, it is possible to increase the color document reading speed of the image reading device 1. It is also possible to increase the productivity of the image reading device 1.

Moreover, the image reading device 1 has an edge processing section 92 that recognizes whether or not the pixel of interest is an edge. When the edge processing section 92 recognizes the pixel of interest to be an edge, it then recognizes whether or not the edge is a monochrome edge at a border with white or black. When the edge processing section 92 recognizes the pixel of interest to be a monochrome edge, the remaining color component generation section 9 generates the pixel value of the light source color of the pixel of interest as the pixel value of a color component other than the light source color of the pixel of interest. When the edge processing section 92 recognizes the pixel of interest not to be a monochrome edge, the remaining color component generation section 9 generates the pixel value of a color component other than the light source color of the pixel of interest such that it is equal to the mid value between the pixel values of interpolation target pixels, which are two pixels that sandwich the pixel of interest in the direction perpendicular to lines and of which the light source color is the color about to be generated. In this way, it is possible to appropriately determine the pixel value of a color component other than the light source color of the pixel of interest in such a way that a monochrome edge, which tends to be conspicuous to the human eye, is accurately recognized as an edge within color image data.

Moreover, at a monochrome edge (that is, where there is a large change in density in terms of black and white), the pixel values of different colors are expected to change in a similar way. Accordingly, the edge processing section 92 extracts pixels that are located across, with the pixel of interest at the center, a total of five or more lines in the direction perpendicular to lines and that are read in the light source color. The edge processing section 92 recognizes the pixel of interest to be a monochrome edge when the following conditions are met: of the extracted pixels, two or less are inflection point pixels, which are pixels whose pixel values are by a prescribed value smaller or greater than the pixel values of both of the pixels adjacent to them; and no adjacent pixels are inflection point pixels. When the conditions are not met, the edge processing section 92 recognizes the pixel of interest not to be a monochrome edge.

In this way, it is possible to accurately determine whether or not the pixel of interest constitutes a monochrome edge. Thus, it does not occur that a pixel that is not a monochrome edge in a document is taken as an edge or a pixel that is a monochrome edge in a document is taken as not an edge. It is thus possible to appropriately determine the pixel value of color components other than the light source color of the pixel of interest.

Moreover, the image reading device (image forming apparatus) has the edge processing section 92 that recognizes whether or not the pixel of interest is an edge. When the edge processing section 92 recognizes the pixel of interest not to be an edge, the remaining color component generation section 9 generates the pixel value of a color component other than the light source color of the pixel of interest such that it is the mid value between the pixel values of interpolation target pixels, which are two pixels that sandwich the pixel of interest in the direction perpendicular to lines and that are read in, as the light source color, the color about to be generated. In this way, the pixel values of pixels that are obtained by actual reading and that are close in position in the direction perpendicular to the direction of lines (the sub scanning direction) are taken into consideration. It is thus possible to determine (estimate) the pixel values of colors (remaining color components) about to be calculated in such a way as to obtain a smooth change in gradation.

Moreover, the remaining color component generation section 9 generates as the pixel value of a color component other than the light source color the sum of two values that are obtained by multiplying each of the interpolation target pixels by a coefficient that is so set that the closer the distance the greater the contribution. This makes it possible to accurately determine the pixel value of colors other than the light source color of the pixel of interest through linear interpolation.

The prescribed value is a constant value, or a value obtained by multiplying by a previously determined number the standard deviation of pixel values, as calculated by the remaining color component generation section 9, within a prescribed region with a predetermined pixel within image data at the center.

The light sources (the R, G, and B lamps 73R, 73G, and 73B) are in three colors, namely red, green, and blue, and the remaining color component generation section 9 generates the pixel values of two of red, green, and blue as the pixel values of color components other than the light source color of the pixel of interest. This eliminates the need to read three colors (three times) per line, and thus allows fast reading of a document.

Moreover, the image forming apparatus (multifunction product 100) includes an image reading device 1 according to the embodiment; it thus includes an image reading device 1 capable of reading color images fast with high productivity. Accordingly, it is possible to offer a high-productivity, high-performance image forming apparatus.

Other embodiments will now be described. The embodiment described above deals with an example where the reading unit 7 including the image sensor 72 and the light source section 71 is provided within the image reading section 2. In addition, for the reading of the reverse side of a document, in the document transport section 33 within the document transport section 3, between the feed-reading contact glass 21a and the pair of document ejection rollers 34, there may be provided a second reading unit 70 (see FIG. 2) of a CIS (contact image sensor) type. Also in the color reading by the second reading unit 70, light sources included in the second reading unit 70 may be lit in one color per line so that an image reading device 1 included in the second reading unit 70 reads one color per line, with a data generation section 8 and a remaining color component generation section 9 like those described above provided also in the second reading unit 70 so that, also for the results of the reading by the second reading unit 70, remaining color components are generated.

Although the embodiment described above deals with a reading unit 7 of a CIS type, the image reading device 1 may instead be of a CCD type where reflected light is directed to an image sensor through a plurality of mirrors or lenses.

The present disclosure may be grasped as disclosing methods.

The embodiments presented herein are not meant to limit the scope of the present disclosure in any way. What is disclosed herein may be implemented with any modifications and variations made within the spirit of the present disclosure.

What is claimed is:
1. An image reading device comprising:
a light source section that shines light on a document along a line direction, that includes light sources of a plurality of colors, and that emits light in one color during a period for reading one line and switches a color of a light source lit cyclically from one line to the next;

an image sensor that, based on light reflected from the document, reads one color per line;
a data generation section that, based on an output of the image sensor, generates image data of a light source color which is the color of the light source lit during reading;
a memory that stores a plurality of lines' worth of the image data generated by the data generation section;
a remaining color component generation section that, by using the plurality of lines' worth of the image data stored in the memory, generates a pixel value of a color component other than the light source color based on pixel values of pixels around a pixel of interest; and
an edge processing section that recognizes whether or not the pixel of interest is an edge, wherein
when the edge processing section recognizes the pixel of interest to be an edge, the edge processing section then recognizes whether or not the edge is a monochrome edge at a border with white or black, and
when the edge processing section recognizes the pixel of interest to be a monochrome edge, the remaining color component generation section generates the pixel value of the color component other than the light source color of the pixel of interest such that it is a pixel value of the pixel of interest in the light source color, and when the edge processing section recognizes the pixel of interest not to be a monochrome edge, the remaining color component generation section generates the pixel value of the color component other than the light source color of the pixel of interest such that it is a mid value between pixel values of interpolation target pixels,
the interpolation target pixels being two pixels that sandwich the pixel of interest in a direction perpendicular to the line direction and of which the light source color is a color to be generated.

2. The device according to claim 1, wherein
the edge processing section extracts pixels that are located across, with the pixel of interest at a center, a total of five or more lines in a direction perpendicular to lines and that are read in the light source color, the edge processing section recognizing, when a previously determined condition is met, the pixel of interest to be a monochrome edge and recognizing, when the previously determined conditions is not met, the pixel of interest not to be a monochrome edge,
the condition comprising a condition that, of the extracted pixels, two or less are inflection point pixels and a condition that no adjacent pixels are inflection point pixels,
an inflection point pixel denoting a pixel of which a pixel value is by a prescribed value smaller or greater than pixel values of both of pixels adjacent thereto.

3. The device according to claim 2, wherein
the prescribed value is a constant value, or a value that is obtained by multiplying by a previously determined number a standard deviation of pixel values, calculated by the remaining color component generation section, in a prescribed region with a given pixel within the image data at a center.

4. The device according to claim 1, wherein
the remaining color component generation section generates the pixel value of the color component other than the light source color such that it is a sum of two values that are obtained by multiplying each of the interpolation target pixels by a coefficient that is so set that contribution increases with increasing distance.

5. The device according to claim 1, wherein
the light sources are in three colors, namely red, green, and blue, and
the remaining color component generation section generates the pixel value of the color component other than the light source color of the pixel of interest such that it is a pixel value of two of red, green, and blue.

6. An image forming apparatus comprising the image reading device according to claim 1.

7. An image reading device comprising:
a light source section that shines light on a document along a line direction, that includes light sources of a plurality of colors, and that emits light in one color during a period for reading one line and switches a color of a light source lit cyclically from one line to the next;
an image sensor that, based on light reflected from the document, reads one color per line;
a data generation section that, based on an output of the image sensor, generates image data of a light source color which is the color of the light source lit during reading;
a memory that stores a plurality of lines' worth of the image data generated by the data generation section;
a remaining color component generation section that, by using the plurality of lines' worth of the image data stored in the memory, generates a pixel value of a color component other than the light source color based on pixel values of pixels around a pixel of interest, and
an edge processing section that recognizes whether or not the pixel of interest is an edge, wherein
when the edge processing section recognizes the pixel of interest not to be an edge, the remaining color component generation section generates the pixel value of the color component other than the light source color of the pixel of interest such that it is a mid value between pixel values of interpolation target pixels,
the interpolation target pixels being two pixels that sandwich the pixel of interest in a direction perpendicular to the line direction and of which the light source color is a color to be generated.

8. A method of controlling an image reading device, comprising:
using light sources of a plurality of colors;
shining light on a document along a line direction;
emitting light in one color during a period for reading one line, switching a color of a light source lit cyclically from one line to the next;
reading, based on light reflected from the document, one color per line;
generating image data of a light source color which is the color of the light source lit during reading;
storing a plurality of lines' worth of the image data generated;
generating, by using the plurality of lines' worth of the image data stored, a pixel value of a color component other than the light source color based on pixel values of pixels around a pixel of interest;
recognizing whether or not the pixel of interest is an edge;
recognizing, when the pixel of interest is recognized to be an edge, whether or not the edge is a monochrome edge at a border with white or black;
generating, when the pixel of interest is recognized to be a monochrome edge, the pixel value of the color component other than the light source color of the pixel of interest such that it is a pixel value of the pixel of interest in the light source color; and generating, when the pixel of interest is recognized not to be a monochrome edge, the pixel value of the color component other than the light source color of the pixel of interest such that it is a mid value between pixel values of interpolation target pixels, the interpolation target pixels being two pixels that sandwich the pixel of interest in a direction perpendicular to the line direction and of which the light source color is a color to be generated.

9. The method according to claim 8, further comprising:
extracting pixels that are located across, with the pixel of interest at a center, a total of five or more lines in a direction perpendicular to lines and that are read in the light source color;
recognizing, when a previously determined condition is met, the pixel of interest to be a monochrome edge; and
recognizing, when the previously determined conditions is not met, the pixel of interest not to be a monochrome edge,
the condition comprising a condition that, of the extracted pixels, two or less are inflection point pixels and a condition that no adjacent pixels are inflection point pixels,
an inflection point pixel denoting a pixel of which a pixel value is by a prescribed value smaller or greater than pixel values of both of pixels adjacent thereto.

10. The method according to claim 9, wherein
the prescribed value is a constant value, or a value that is obtained by multiplying by a previously determined number a standard deviation of pixel values in a prescribed region with a given pixel a within the image data t a center.

11. The method according to claim 8, further comprising:
obtaining two values by multiplying each of the interpolation target pixels by a coefficient that is so set that contribution increases with increasing distance; and
generating the pixel value of the color component other than the light source color such that it is a sum of the two values obtained.

12. The method according to claim 8, wherein
the light sources are in three colors, namely red, green, and blue, and
the pixel value of the color component other than the light source color of the pixel of interest is generated such that it is a pixel value of two of red, green, and blue.

13. A method of controlling an image reading device, comprising:
using light sources of a plurality of colors;
shining light on a document along a line direction;
emitting light in one color during a period for reading one line, switching a color of a light source lit cyclically from one line to the next;
reading, based on light reflected from the document, one color per line;
generating image data of a light source color which is the color of the light source lit during reading;
storing a plurality of lines' worth of the image data generated;
generating, by using the plurality of lines' worth of the image data stored, a pixel value of a color component other than the light source color based on pixel values of pixels around a pixel of interest;
recognizing whether or not the pixel of interest is an edge;
generating, when the pixel of interest is recognized not to be an edge, the pixel value of the color component other than the light source color of the pixel of interest such that it is a mid value between pixel values of interpolation target pixels,
the interpolation target pixels being two pixels that sandwich the pixel of interest in a direction perpendicular to the line direction and of which the light source color is a color to be generated.

* * * * *